Patented June 2, 1925.

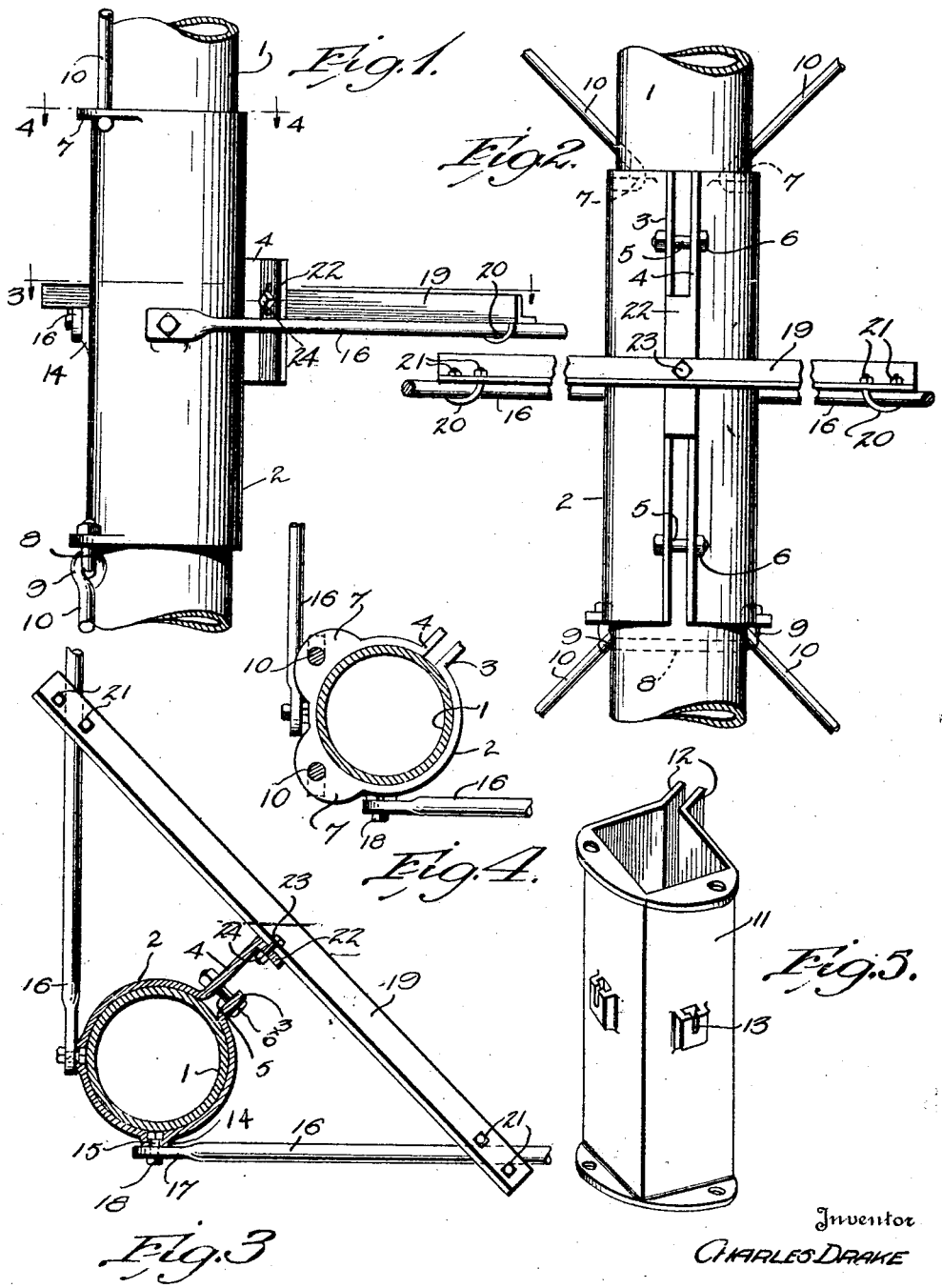

1,539,832

UNITED STATES PATENT OFFICE.

CHARLES DRAKE, OF MANNINGTON, WEST VIRGINIA.

CLAMPING ELEMENT.

Application filed June 2, 1923. Serial No. 643,092.

*To all whom it may concern:*

Be it known that I, CHARLES DRAKE, a citizen of the United States, residing at Mannington, in the county of Marion and State of West Virginia, have invented certain new and useful Improvements in Clamping Elements, of which the following is a specification.

This invention relates to derrick clamps, and more particularly to a one-piece clamp for fastening the leg sections of a derrick to each other and for fastening the diagonal braces and horizontal girths to the leg sections.

An object of the invention is to provide a clamping element that may be readily attached or detached in assembling derricks and taking them down.

A further object is to provide means for connecting the adjacent horizontal girths to each other to reenforce them.

A further object is to provide means for readily connecting the diagonal braces to the clamping element.

In the accompanying drawings, I have shown several embodiments of the invention. In this showing:

Figure 1 is a front elevation of a clamp in position showing a tubular form of clamp and derrick, Figure 2 is a rear elevation, Figure 3 is a horizontal sectional view on line 3—3 of Figure 1, Figure 4 is a similar view on line 4—4 of Figure 1, and, Figure 5 is a perspective view of a clamp for use in connection with angle iron derricks.

Referring to the drawings, the reference numeral 1 designates the leg sections of the derrick which are adapted to be connected to each other. The abutting ends of the leg sections are surrounded by a clamping element consisting of a body portion 2 which is tubular or cylindrical and substantially surrounds the ends of the leg sections. The adjacent edges of the clamping element are provided with flanges 3 and 4 arranged substantially parallel to each other and provided with openings for the reception of bolts 5. These bolts are adapted to receive nuts 6 by means of which the clamping element is tightened on the leg sections of the derrick. The upper and lower edges of the clamping elements are provided with horizontal ears 7 and these ears are provided with openings for the reception of eye-bolts 8. The eye-bolts are connected to eyes 9 formed in the ends of the diagonal braces 10.

In Figure 5 of the drawings, I have shown a clamping element 11 which is substantially rectangular in cross section for use in connection with angle iron derricks. This form is provided with flanges 12 arranged substantially parallel to each other for the reception of the fastening bolts 5. In either form of the invention, the horizontal girths are connected to the outside of the clamping element. A slot 13 is first cut in the metal from which the clamping element is formed and the material around the slot is then pressed outwardly, as at 14, to provide a space for the reception of the head of a bolt 15, the body portion of the bolt projecting through and beyond the slot 13. A horizontal girth 16 is provided with a flattened end portion 17, having an opening for the reception of the bolt 15 and a nut 18 is placed on the end of the bolt. As shown, two of these slots are provided substantially at right angles to each other to receive the ends of the adjacent girths. A bracing member 19 extends diagonally across the corner of the derrick on the inside of the clamping element and is connected to the horizontal girths. As shown, the bracing member is formed of angle iron and the horizontal portion is provided with a pair of openings adjacent each end. These openings are adapted to receive the ends of a U-bolt 20, which extends around the horizontal girth. Suitable nuts 21 are arranged on the ends of the bolt. The central portion of the vertical arm of the angle iron is connected to a web or projection 22 formed on the end of the flange 4. As shown, a bolt 23 is passed through registering openings in these members and a nut 24 is placed on the end of the bolt.

It will be apparent that the construction provides a one-piece clamping element by means of which the two leg sections are secured to each other and the girths and braces secured to the clamping element. The device may be assembled and disassembled in a comparatively easy manner and forms a substantial support for the parts when assembled.

It is to be understood that the form of my invention herewith shown and described is to be taken as a preferred example of the same and that various changes in the shape, size, and arrangement of parts may be resorted to without departing from the spirit of the invention or the scope of the subjoined claim.

I claim:

A derrick clamp comprising a body portion adapted to embrace the abutting ends of adjacent leg sections of a derrick, the edges of said body portion being provided with outwardly extended, substantially parallel flanges, said flanges being provided with openings for the reception of bolts, the upper and lower ends of said body portion being provided with ears, means for securing the diagonal braces to said ears, means for securing the horizontal girths to the body portion of said clamping element, a web formed on the outer edge of one of said flanges, and a bracing member secured to said web and to said girths.

In testimony whereof, I affix my signature in presence of two witnesses.

CHARLES DRAKE.

Witnesses:
 IRENE RUDY,
 LILLIE SHANKS.